United States Patent
Nölle

(10) Patent No.: US 7,008,154 B1
(45) Date of Patent: Mar. 7, 2006

(54) RETAINING NET

(75) Inventor: Hans Nölle, Schwelm (DE)

(73) Assignee: Nolle-Pepin GmbH & Co. KG, Schwelm (DE)

( * ) Notice: Subject to any disclaimer, the term of this patent is extended or adjusted under 35 U.S.C. 154(b) by 9 days.

(21) Appl. No.: 10/129,703

(22) PCT Filed: Oct. 28, 2000

(86) PCT No.: PCT/EP00/10637

§ 371 (c)(1),
(2), (4) Date: May 8, 2002

(87) PCT Pub. No.: WO01/34433

PCT Pub. Date: May 17, 2001

(30) Foreign Application Priority Data

| Nov. 11, 1999 | (DE) | 299 19 892 U |
|---|---|---|
| Dec. 8, 1999 | (DE) | 299 21 584 U |
| Dec. 10, 1999 | (DE) | 299 21 657 U |
| Dec. 10, 1999 | (DE) | 299 21 661 U |
| Aug. 4, 2000 | (DE) | 200 13 484 U |

(51) Int. Cl.
*B60P 7/08* (2006.01)

(52) U.S. Cl. ............................. 410/118; 410/97; 87/2
(58) Field of Classification Search ................. 410/97, 410/117–118; 87/2; 248/499
See application file for complete search history.

(56) References Cited

U.S. PATENT DOCUMENTS

| 3,322,176 | A |  | 5/1967 | Geller |  |
|---|---|---|---|---|---|
| 4,924,814 | A |  | 5/1990 | Beaudet |  |
| 5,452,973 | A | * | 9/1995 | Arvin | 410/118 |
| 6,017,174 | A | * | 1/2000 | Ross et al. | 410/100 |
| 6,152,664 | A | * | 11/2000 | Dew et al. | 410/100 |
| 6,183,177 | B1 | * | 2/2001 | Dahlgren | 410/100 |
| 6,345,944 | B1 | * | 2/2002 | Florence | 410/118 |
| 6,419,433 | B1 | * | 7/2002 | Chou | 410/97 |
| 6,637,991 | B1 | * | 10/2003 | Looker et al. | 410/97 |

FOREIGN PATENT DOCUMENTS

| DE | 1 923 518 U | 9/1965 |
|---|---|---|
| DE | 32 03 615 A1 | 8/1983 |
| DE | 83 23 849.2 U | 12/1983 |
| DE | 86 01 047.6 U | 4/1986 |
| DE | 199 15 910 A1 | 10/2000 |
| EP | 0 942 087 A2 | 11/1999 |
| FR | 2 474 976 | 8/1981 |
| FR | 2 547 255 | 12/1984 |
| FR | 0 221 222 | 5/1987 |
| GB | 2 033 849 A | 5/1980 |
| GB | 2 111 439 A | 7/1983 |
| GB | 2 196 907 A | 5/1988 |
| WO | WO 01/34433 A1 | 8/2000 |

* cited by examiner

*Primary Examiner*—Stephen Gordon
(74) *Attorney, Agent, or Firm*—Herbert Dubno

(57) ABSTRACT

A holding net having a net component, mesh or weave made of several pluralities of threads and an edge which is at least partially formed by an edge girth. The edge of the net has its edge girth made of the same material as the net mesh and threads or strands of the net mesh are woven into the girth.

42 Claims, 7 Drawing Sheets

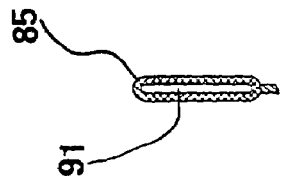
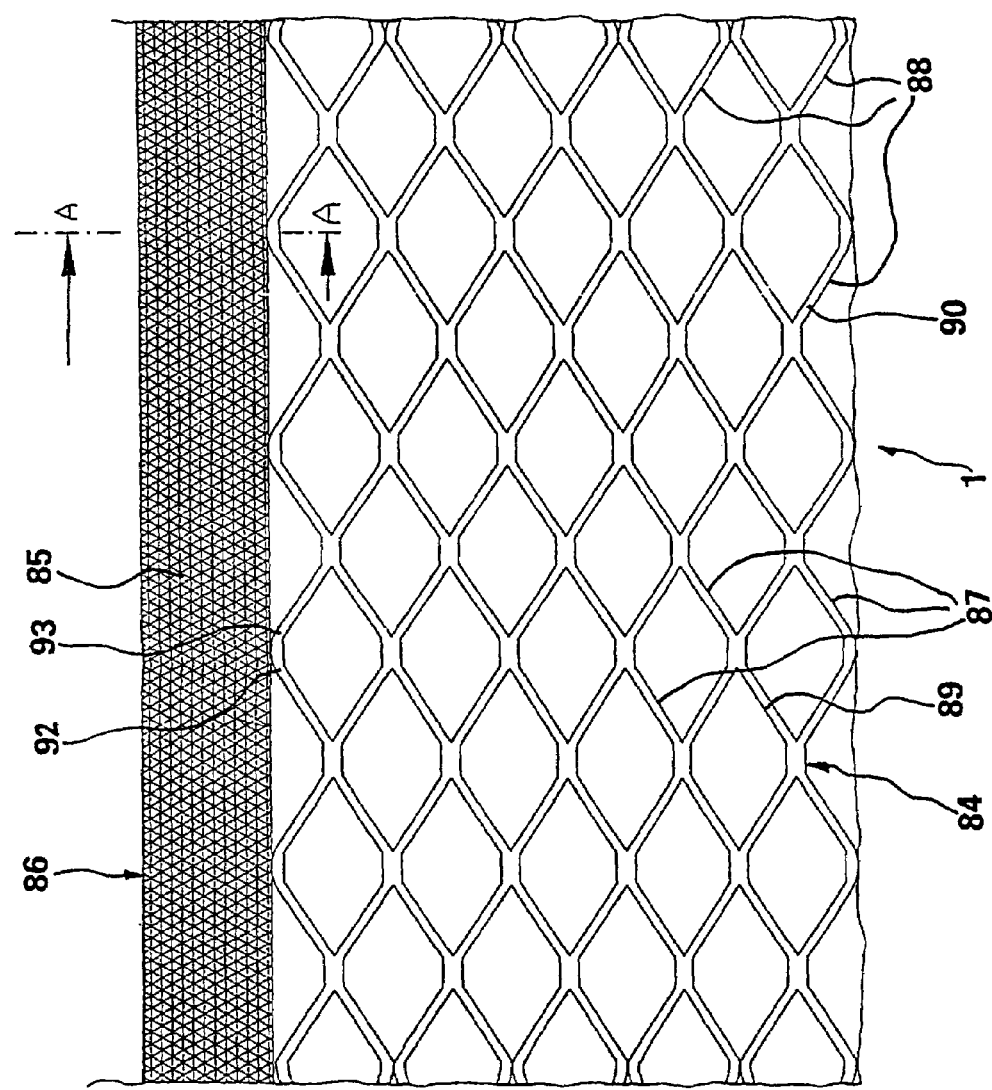

RETAINING NET

CROSS REFERENCE TO RELATED APPLICATIONS

This application is a national phase of PCT/EP 00/10637 filed 28 Oct. 2000 and is based upon German national applications 299 19 892.8 of 11 Nov. 1999, 299 21 584 filed 8 Dec. 1999, 299 21 657 filed 10 Dec. 1999, 299 21 661.6 filed 10 Dec. 1999 and 200 13 484.1 filed 4 Aug. 2000 under the International Convention.

FIELD OF THE INVENTION

The invention relates to a retaining net comprising a net component or net weave (web) that is formed by a plurality of strands that extend inclined to one another, each having several net strands, and an edge that is formed at least partially by an edge girth.

BACKGROUND OF THE INVENTION

Retaining nets of this type are produced for various requirements and in various forms.

OBJECT OF THE INVENTION

The object of the invention is to further develop or construct the aforementioned generic retaining net in such a way that it can be produced in a technically simple manner and to fashion it in such a manner that the retaining net has the required characteristics and fulfills the desired aesthetic criteria.

SUMMARY OF THE INVENTION

According to the invention, this object is achieved in that the edge of the retaining net has an edge girth made of the same material as the net component or net weave at least in part and in that the ends of the pluralities of strands associated with said girth are woven into it. With this design, an optically appealing retaining net can be produced, whereby the net component or net weave and the weaved edge girth can be produced simultaneously in a single operation.

If, for example, the retaining net according to the invention is designed as a floor net for motor vehicles or the like and has an edge about the border of the net component, two edge girths being arranged on two opposite and parallel borders of the net component that are made of the same material as the net component and the strand ends forming the respective border of the net component are woven into said girths, and that an edge girth each, made of the same material as the net component, is placed on the other borders of the net component to which the strand ends forming the respective border of the net component are sewn and connected at its ends with the ends facing it of edge girths adjacent thereto, a net web can be produced which has edge girths on its opposite sides that are simultaneously produced with the net component and interwoven with the respective strand ends of the net strands. To produce the desired retaining net, this net web can be cut, further edge girths then being sewn onto the resultant borders of the net component that are made of the same material as the edge girths made with the net web and which optically correspond to said edge girths.

The retaining net of the invention or its net component and edge can be made e.g. from polypropylene or polyamide. However, other suitable materials are also possible. The edge girths can be any width desired, so that the net can be made to correspond to all feasible technical and aesthetic requirements.

The retaining net of the invention can be quadrangular, trapezoidal, rectangular or square. However, round or polygonal other designs are also possible.

According to an advantageous embodiment of the retaining net according to the invention, the retaining net has two net components connected to one another by means of a common edge girth that is symmetrical relative to their common edge girth and which, in addition to the edge girths parallel to their common edge girth, are joined together at their further edge girths. As a result, a retaining net is produced in a simple manner that can be used for various purposes and that can be easily filled and emptied, namely through the opening formed by the two edge girths not joined together.

Alternatively, it is possible for the retaining net to have at least three net components, two net components of which are respectively joined together by means of an edge girth common to both net components, a middle net component being made symmetrical to its central axis or two middle net components being symmetrical to their common edge girth, whereby, on the one side of the middle net component or components, successively following net components are symmetrical to the successively consecutive net components on the other side of the middle net component or components that are associated with them respectively, and wherein the parallel edge girths, each associated with a net component and not with the central axis of the middle net component or with the edge girth common to the two middle net components, that have come to lie on top of one another during folding of the retaining net about the central axis of the middle net component or the edge girth common to the two middle n t components are joined together.

With the two embodiments described above for the retaining net of the invention, a retaining net according to the invention having the desired measurements can be created from the basic net web common for all retaining nets of the invention.

According to a further advantageous embodiment, the retaining net of the invention preferably has a retaining or clamping element or at least on each of its corners, by means of which it can be secured to a mounting installation surface.

Preferably, the retaining and clamping elements are made as hook parts to simplify handling.

According to a practical further development of the hook part according to the invention, their net component and/or surrounding edge is/are elastic.

To design the retaining net of the invention in such a way that it can be made with more or less any dimensions desired without having to substantially increase the requirements, with increasing dimensions of the retaining net, for the material used to produce the retaining net, it is advantageous if the retaining net has an edge girth on each of two opposite sides parallel to one another and if the net component has at least one middle girth that is arranged in the net component at a distance from and parallel to the two edge girths, each middle and edge girth being made of the same material as the remaining net component and net strands of the pluralities of strands are woven into strand ends facing it.

By using middle girths between the edge girths of the net component, it is also possible to produce retaining nets that are very large without having to use a higher quality material. A further increase in the mechanical resistance of the retaining net according to the invention is obtained thereby that both the edge girth and the middle girth are made in a single operation with the net strands forming the net mesh fields of the net component, whereby the strand ends of the net strands facing the respective edge girths and middle girths are interwoven with the edge or middle girths. The net component of the retaining net according to the invention can be produced in the form net component webs, then making it possible to cut a desired net component out of a net component web of this type with the respectively required contour and with the required dimensions in each case. The manufacturing process for the retaining net of the invention is thereby considerably simplified.

The retaining net according to the invention can advantageously be made of polypropylene or polyamide, these materials ensuring the required elasticity for the retaining net of the invention.

The edge and/or middle girths of the net component can have any width desired, so that aesthetic wishes can also be easily met in addition to mechanical requirements.

According to an advantageous embodiment of the retaining net of the invention, each middle girth is spaced the same distance from the edge and/or middle girth adjacent thereto; however, it is also possible to dimension the distances between the middle and edge girths in dependency on the expected loads of the retaining net.

According to an advantageous embodiment, the net component of the retaining net of the invention has three middle girths.

Moreover, the middle and edge girths can advantageously have the same width.

The meshes of the net component of the retaining net according to the invention can be rectangular, square, honeycombed or rhombic.

In order to design the retaining net of the invention in such a way that it is suitable for attachment to a mounting surface on the back of a back rest, to a wall or ceiling surface or the like, it is provided with a comparatively rigid frame element that can be attached to the mounting surface, whereby the net component is elastic, has a free edge, is fixed on its further edge to the frame element and has the edge girth on its free edge. Retaining nets of this type are produced for various uses and in various forms, it being possible to use them, for example, in transportation means such as airplanes, trains, ships, motor vehicles or the like. Due to the fact that the edge girth forming the free edge of the net component of the retaining net is made of the same material as the remaining net component and is woven into the strand ends of the net strands of the plurality of strands at the free edge of the net component, the entire net component of the retaining net, including the edge girth forming the free edge, can be produced in a single operation. Depending on the design of the retaining net, a net component with the desired dimensions can be cut out of the net web in a single operation, the free edge of the net component, i.e. the edge of the net component not completely and directly fixed to the frame element, being formed by the edge girth produced in a single operation with the net component.

Advantageously, the entire net component, including the edge girth, can be made of polypropylene or polyamide.

To readily meet all aesthetic demands, it is advantageous if the edge girth forming the free edge of the net component can be made such that it has any width desired.

According to an advantageous embodiment of the retaining net according to the invention, the edge girth forming the free edge of the net component is fixed to the frame element at both its ends; for example, it can be fixed by means of clamps.

An optically pleasing and technically flawlessly functioning design of the retaining net of the invention is obtained if the frame element has a U-shaped structure with a base and two sides, the edge girth forming the free edge of the net component then extending between the free ends of the two sides of the frame element.

To eliminate unnecessary stresses in the frame element, it is advantageous if the contour of the frame element is adapted to the mounting surface accommodating it.

Attaching the net component to the frame element can be accomplished in a technically simple manner if the edge meshes of the net component situated on the frame element are crossed through by an edge element which is, in turn, fixed to the frame element. Attaching the edge element to the frame element, on the one hand, and to the net component, on the other hand, is brought about with comparatively little effort if the edge element extends beyond all edges of the net component situated on the frame element and can be clamped in clip receptacles on the frame element.

By means of an advantageous embodiment of the retaining net according to the invention in which it is designed as a retaining loop for winding up on a bar-shaped, rod-shaped, cylindrical or similarly shaped element, e.g. on a sun or light visor of a motor vehicle, and for fixing objects, e.g. writing utensils, toll cards, handys, radio transmitters, food and the like, to this element, articles that are not required at the time can be securely fastened, on the one hand, and are easily accessible, on the other hand, e.g. to the sun or light visor of a vehicle. In this case, the retaining loop has a net component and, at their inner edges facing the edge component, two edge girths, the two edge girths being on the two longitudinal sides of the net component woven into the strand ends of the net strands of the plurality of strands facing said inner edges and the net component and the two edge girths being made of the same material. Due to the elasticity of a retaining loop of this type, both in peripheral direction and in its axial direction at a right angle to the peripheral direction, variously configured items can be fastened e.g. to the sun or light visor of a vehicle by means of the retaining loop. The items remain easily accessible to a driver or passenger while, moreover, the items held by means of the retaining loop remain largely visible due to the design of the middle part of the retaining loop as net component. Furthermore, the retaining loop according to the invention is portable and, due to its elastic structure, is usable in connection with elements provided with various cross sections. The net component and the edge girths of the retaining loop of the invention can be produced in a single integrated step in an endless web which can be divided in any manner desired by cuts made in accordance with the desired dimensions.

A simplification of the production of the retaining loop according to the invention is attained if the retaining loop includes a connecting link, by means of which the two face ends of the net component, the first edge girth and the second edge girth are each joined together. In this advantageous embodiment, the net component and the two edge girths extending on its longitudinal sides can be present in the form of a web, whereby the two face sides of the web can be joined together by means of the connecting link. A web of this type that has the net component and the edge girths can be cut into any longitudinal sections desired, so that r taining loops can be easily produced in every desired length.

The plurality of strands that form the net component can be oriented in such a way that they form square, rectangular, honey-combed or rhombic net meshes.

To further reduce the manufacturing expenditure of the retaining loop, it is advantageous if the net component and the two edge girths as well as the connecting link are made of the same material; polypropylene and polyamide have proven to be especially suitable materials. An appealing aesthetic overall impression of the retaining loop of the invention can also be obtained with this material-related design.

The edge girths of the retaining loop can be made as wide as desired, however, for aesthetic reasons, a design is often selected in which the two edge girths are equally wide.

According to an advantageous embodiment of the retaining loop of the invention, the connecting link is sewn together, on its two sides facing the front ends of the net component and the edge girth, with the strand ends of the net strands of the plurality of strands facing them and the front ends of the edge girths.

To improve the aesthetic overall impression of the retaining loop of the invention, it is advantageous if the outer edges of the connecting link align with the outer edges of the edge girths.

Advantageously, the connecting link can be in the form of a girth band.

According to a further advantageous embodiment of the retaining loop of the invention, a retaining element can be attached to the connecting link thereof, it being possible to bring said retaining element into an open position and into any closed position desired. As a result, small items of various diameters can be fixed to the outer side of the retaining loop so as to be secure and easily accessible.

For this purpose, the retaining element advantageously has burr band fields which can be engaged in a number of contact positions.

With a further development of the retaining net according to the invention which is provided especially for vehicles, the edge is formed at least partially by an edge girth in the form of a hollow tube into which a rod or the like can be inserted. As a result, it is possible to reinforce the respective part of the edge of the retaining net by inserting a rod or the like. In contrast to known retaining nets provided with an edge girth designed as a hollow tube in which the hollow tubular design of the edge girth is obtained by folding over a comparatively wide strip on the net weave or on its net strands allocated to the respective edge section, after which the still strip-shaped edge girth is joined by a seam to form a hollow tube at its edge corners that are superimposed on one another, thus making the production of a retaining net provided with an edge girth of this typ comparatively expensive since, first, the net weave and the strip-shaped edge girth have to be produced, the strip-shaped edge girth joined with the net weave and then, as described, the strip-shaped edge girth is reshaped to form the edge girth in the form of a hollow tube, the retaining net according to the invention is developed further in a corresponding manner, the edge girth of the retaining net designed as a hollow tube is made from the same material as the net weave and woven as a hollow tube into the ends of the strands of the net strands of the plurality of strands of the net weave. In this design of the retaining net according to the invention, it is possible to produce this retaining net, including its net weave and the edge girth, such that it already is in the form of a hollow tube, extending at least over a part of the edge of the net weave in a single operation. The disadvantageous production of seams or the like can be completely omitted.

If a retaining net designed in this way according to the invention has an edge girth in the form of a hollow tube on an almost straight edge section into which a metal rod or the like can be inserted and if the retaining net is fastened to the inner side of a vehicle door at its outer edge that is not provided with the edge girth, it is possible to close the vehicle door thereby that the edge girth of the retaining net containing the metal rod or the like is gripped and pulled in direction of the inside of the vehicle. Although handles or the like are usually provided on the inside of the vehicle door to accomplish closing actions of this type, it happens comparatively often that, due to inattentiveness or for other reasons, in order to close the door, e.g. a retaining net is caught. In the design of the retaining net according to the invention, an undesirable action of this type does not result in damage to the retaining net or the vehicle door.

In this case, it is advantageous if the metal rod or the like situated in the hollow tube has an elongated hole at one end portion, said elongated hole being engaged with a retaining bolt so as to be displaceable in longitudinal direction of the metal rod or the like, said supporting bolt being fastened in turn to the inside of the vehicle door in a suitable manner.

Alternatively, it is possible that the metal rod or the like situated in the hollow tube is connected with the inside of the vehicle door on at least one end, preferably at both ends, by means of a spring that is prestressed in closing direction of the retaining net.

To improve the retaining function of the retaining net according to the invention in the case in which luggage pieces are to be fixed to the mounting surface provided therefor by means of another embodiment of the retaining net, said mounting surface being situated, for example, in the trunk or on the loading surface of a vehicle in this case, it is advantageous if the edge girth of the retaining net in the form of a hollow tube extends over the entire edge of the net weave of the retaining net, a one-part or multipart rod that is formed to correspond to the edge contour of the retaining net being located in the edge girth and the edge girth having clip connecting elements for attaching the retaining net to the mounting surface, e.g. in a motor vehicle. The edge contour of the retaining net may be formed in any manner desired. By means of the one-part or multipart rod placed in the edge girth extending so as to correspond with the edge contour of the retaining net, a reinforcement of the edge of the retaining net is attained by means of which it is prevented that gaps occur between the mounting surface provided to accommodate the luggage pieces and the edge of the retaining net, as a result of which luggage pieces could be shifted.

In the retaining net according to the invention, all edge or middle girths and the net component or net weave can be made of an elastic material.

With a method according to the invention for producing a retaining net, described in greater detail above, the edge girth that forms at least partially the edge of the retaining net is made of the same material as the net component or net weave and the ends of the pluralities of strands associated with said girth are woven into said girth. As a result, the expenditure during production of retaining nets of this type can be considerably reduced.

BRIEF DESCRIPTION OF THE DRAWING

The invention will be described in greater detail in the following with reference to the accompanying drawing. In the drawing:

FIG. 7 is an elevational view of a partial representation of a further embodiment of the retaining net according to the invention; and FIG. 8 is the section A—A in FIG. 7.

SPECIFIC DESCRIPTION

Figure 1:
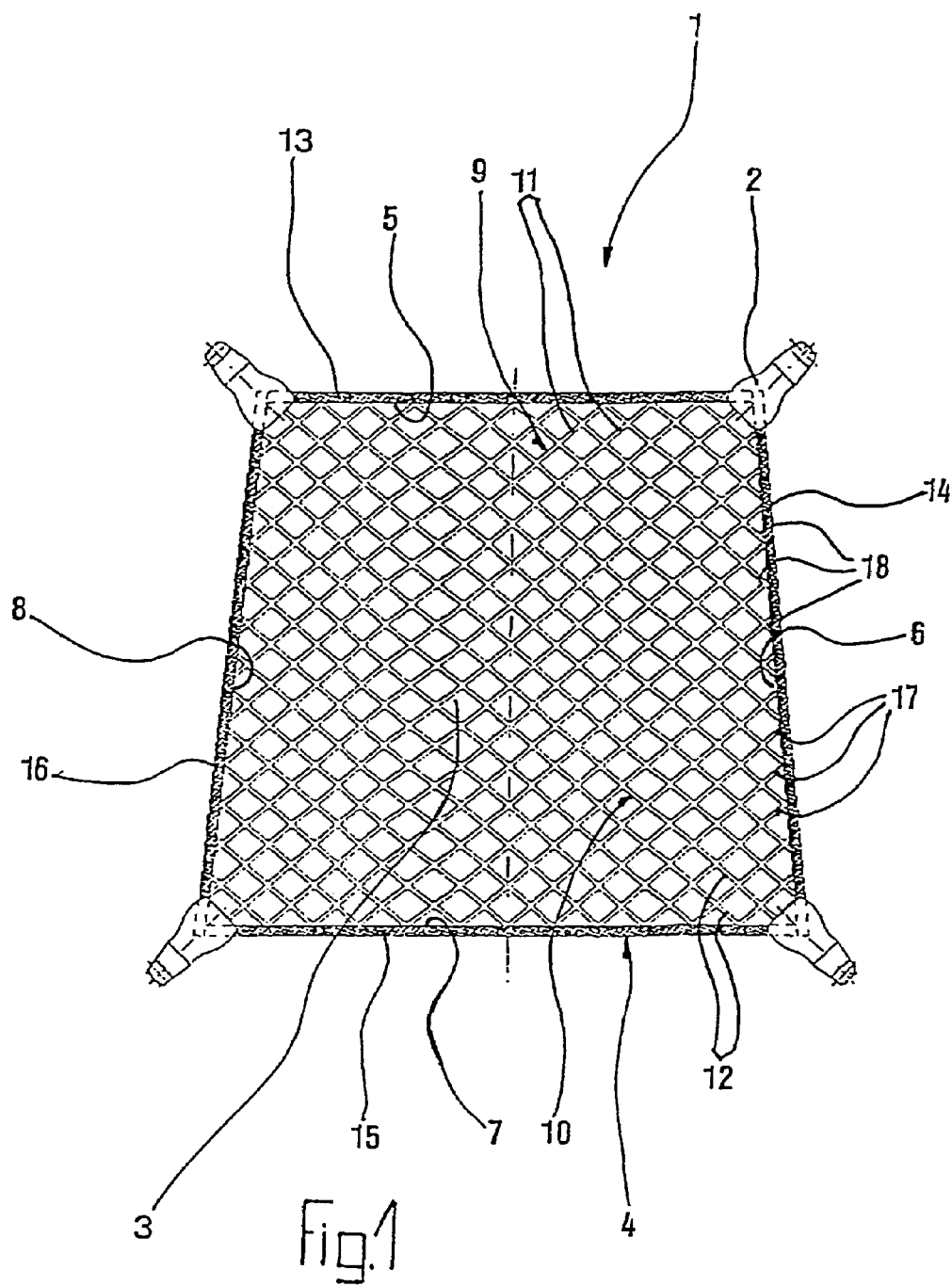
FIG. 1 is an elevational view of a first embodiment of a retaining net according to the invention.

FIG. 1 shows a first embodiment of a retaining net 1 according to the invention. A retaining net 1 of this type can be made, for example, as a floor net which can be used in a motor vehicle to securely hold objects on the floor thereof.

For this purpose, the retaining net 1 has retaining or clamping elements 2 at its corners, by means of which it can be attached to the floor of the motor vehicle at appropriate fastening points.

The retaining net 1 has a net component 3 and a surrounding edge 4 which limits the net component 3 on its edges 5, 6, 7, 8.

In the embodiment shown, the retaining net 1 or the net component 3 is trapezoidal; in principle, the retaining net 1 or net component 3 may have any configuration desired, however, two parallel edges of the net component 3 are preset, the edges 5 and 7 in the embodiment shown.

In the embodiment shown, the net component 3 has two groups of strands 9, 10 extending inclined at a right angle to one another. The groups of strands 9 or 10 each consist of a plurality of net strands 11 or 12 that are parallel to one another. The surrounding edge 4 has four edge girths 13, 14, 15, 16 in the embodiment shown, which are associated with the edges 5, 6, 7, 8 of the net component 3.

The edge girth 13 at the upper edge 5 of the net component 3 in FIG. 1 extends parallel to the edge girth 15 which is situated at the lower edge 7 of the net component 3. The two edge girths 13, 15 are made from the same material as the net component 3, this material being e.g. polypropylene or polyamide.

Furthermore, the edge girths 13 and 15 are woven into the ends 17, 18 of the pluralities of strands 9, 10 of the net component forming the upper edge 5 or lower edge 7 of the net component 3. Thus, it is possible to produce the edge girths 13 and 15 of the retaining net 1 together with the net component 3 thereof in a single operation.

The edge girths 14 and 16, provided on the two lateral edges 6, 8 of the net component 3 are sewn together with the ends 17, 18 of the pluralities of strands 9, 10. The edge girths 14, 16 also consist of the same material as the net component 3.

Every edge girth 13, 14, 15, 16 is joined at its ends with the ends of adjacent edge girths facing them.

The edge girths 13, 14, 15, 16 may be made as wide as desired, so that a suitable edge 4 can be made for the respective net component 3 for every feasible use.

Figure 2:
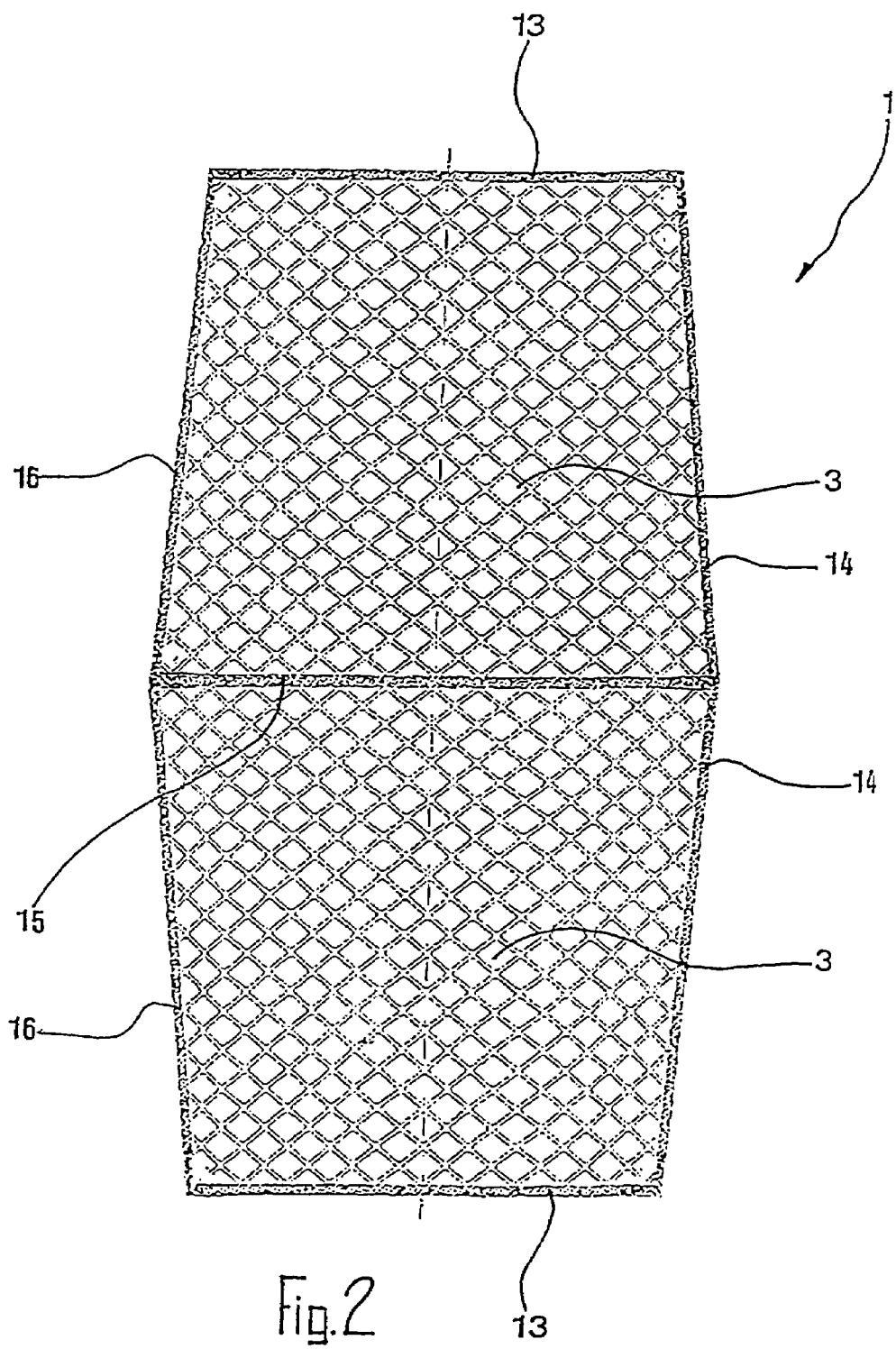
FIG. 2 is an elevational view to a larger scale of a preform of a second embodiment of the retaining net according to the invention.

A preform of a further embodiment of a retaining net 1 according to the invention is shown in FIG. 2. The retaining net shown in FIG. 2 differs from the embodiment shown in FIG. 1 therein that it comprises two net components 3 which are joined together on one edge by a common edge girth 15. The two net components 3 are symmetrical to one another relative to their common edge girth 15.

By folding the lower net component 3 in FIG. 2 about the edge girth 15 common to both net components 3, the additional edge girths 13, 14 and 16 of the lower net component 3 are superposed with the corresponding edge girths 13, 14, 16 of the upper net component 3. By joining the two edge girths 14 and the two edge girths 16 of the two net components 3 now superposed, a retaining net can be created that can be filled or emptied through an opening between the two edge girths 13 of the two net components 3 which are not joined together.

Figure 3:
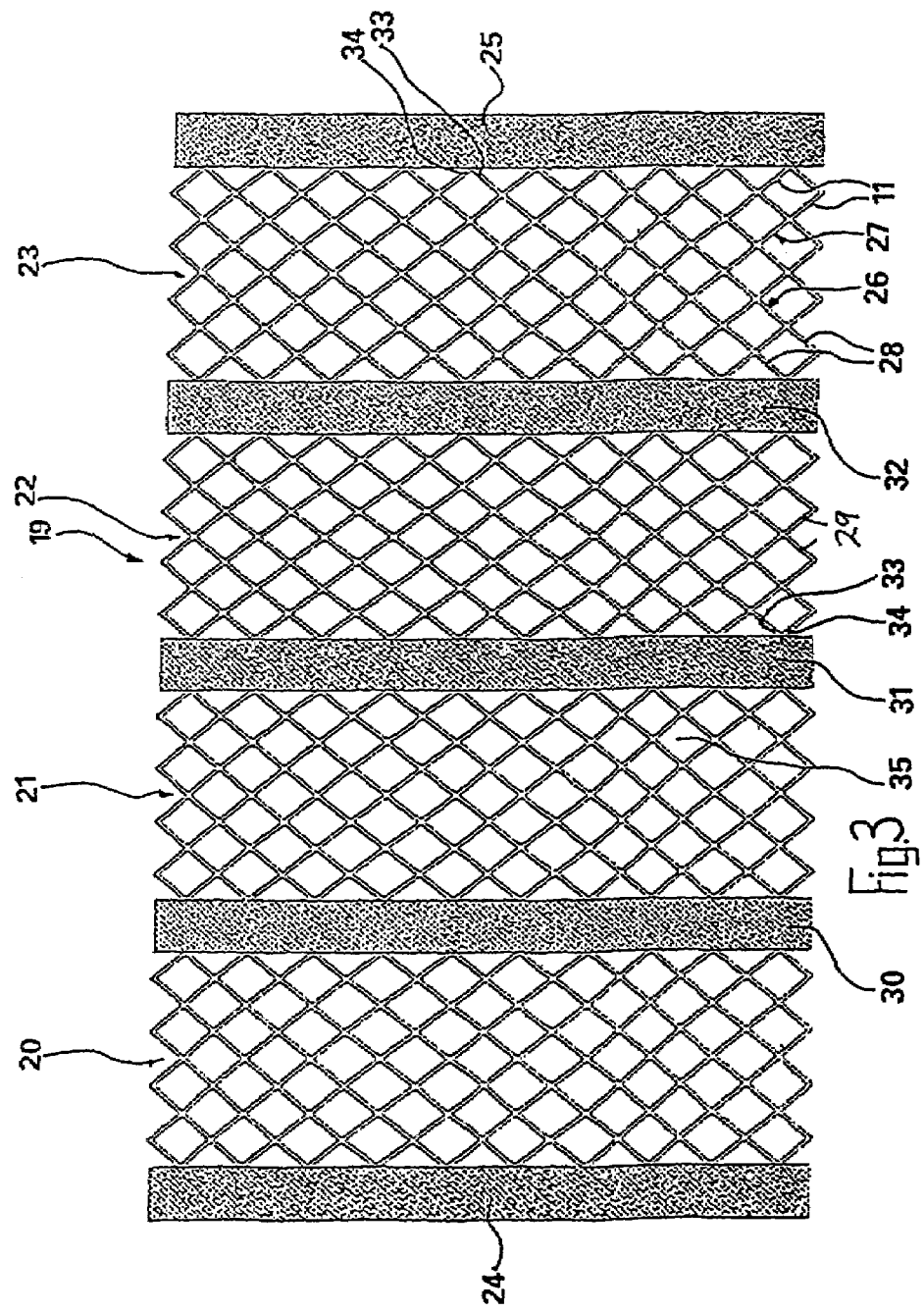
FIG. 3 is an elevational view of a preform of a third embodiment of the retaining net according to the invention.

A net component 19 shown in FIG. 3 has four net mesh fields 20, 21, 22, 23 which are arranged side by side in the embodiment shown there. The two outer net mesh fields 20 and 23 in FIG. 3 each have an edge girth 24 or 25 on their outer side. The two edge girths 24, 25 are equally wide and are made of the same material as the group of strands 26, 27 forming the net mesh fields 20, 21, 22, 23, said groups of strands extending inclined at a right angle to one another in the embodiment shown and each having a number of net strands 28 or 29 parallel to one another.

Middle girths 30, 31, 32 extend between the net mesh fields 20, 21, 22, 23 of the net component 19 shown in FIG. 3, said middle girths being arranged parallel to the two edge girths 24, 25 and are equally spaced from one another and from the edge girths 24, 25, respectively.

Furthermore, the edge girths 24, 25 and the middle girths 30, 31, 32 each have the same width.

The same as the edge girths 24, 25, the middle girths 30, 31, 32 are also made of the same material as the rest of the net component 19, which could e.g. be polypropylene or polyamide. The edge girths 24, 25 and the middle girths 30, 31, 32 are woven into the ends 33, 34 of the net strands 28, 29 of the pluralities of strands 26, 27 associated with said girths. The net component 19 shown in FIG. 3 can be made in a single operation, a net web being produced from which net components 19 can be produced with the dimensions desired in each case.

The edge girths 24, 25 and the middle girths 30, 31, 32 can be made so as to have any width desired.

The net meshes 35 are rhombic in the embodiment of the net component 19 shown in FIG. 3. However, it is also possible to make the net meshes 35 rectangular, square, honeycombed or the like.

The middle girths 30, 31, 32 give the net component 19 great stability and resistance, so that net components 19 can be made with considerably larger dimensions in comparison to the prior art, y t which in every way meet the mechanical demands made on them.

Figure 4:
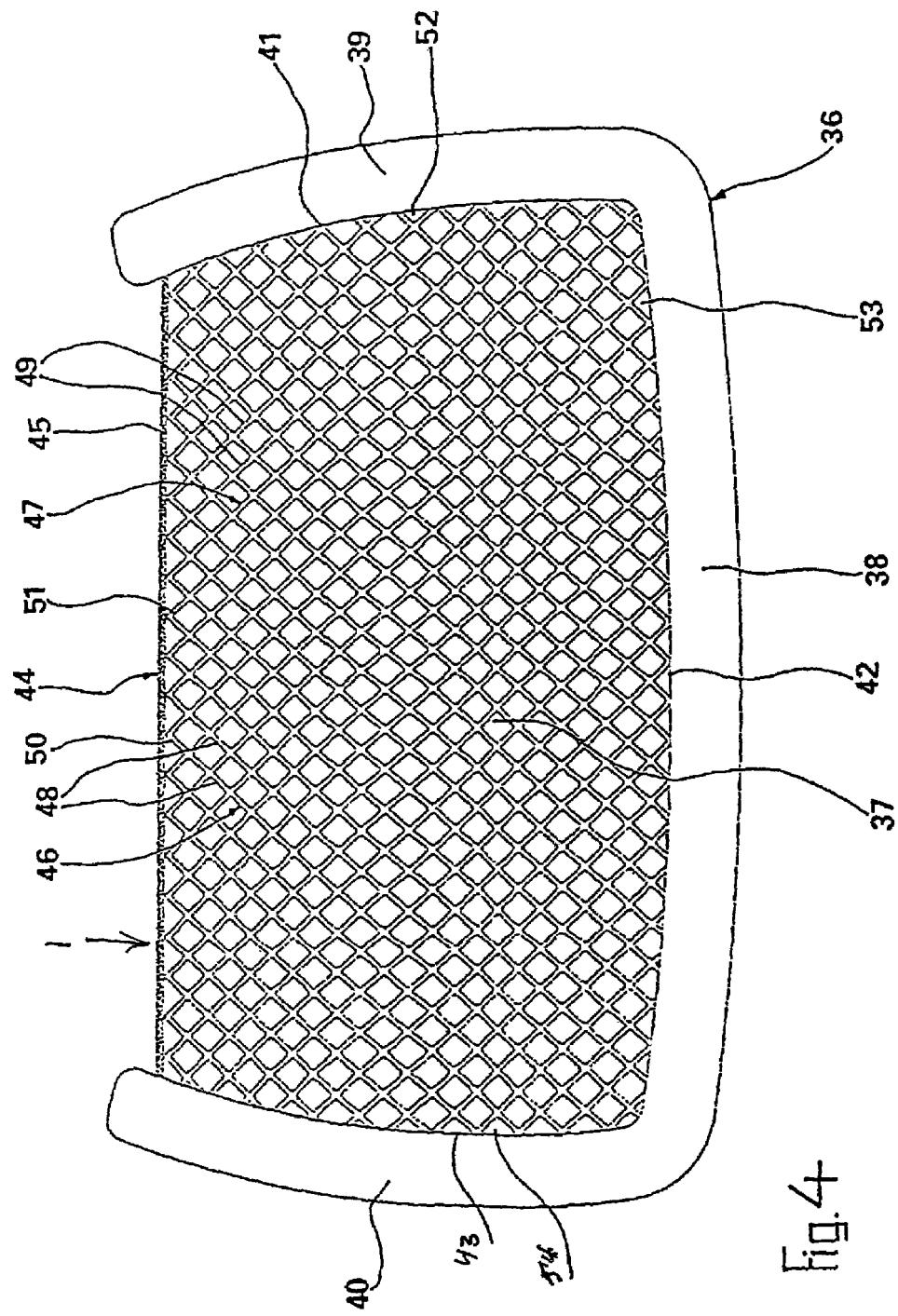
FIG. 4 is an elevational view of a fourth embodiment of the retaining net according to the invention.

A retaining net 1 shown in FIG. 4 has a comparatively rigid frame element 36 and an elastic net component 37.

The retaining net 1 is usually attached to a mounting surface (not shown in FIG. 4), which can e.g. be the back of the back of a seat, a wall or ceiling surface or the like.

A comparatively rigid frame element 36 is U-shaped and has a base 38 from the ends of which a side 39 or 40 each extends more or less upward in vertical direction.

The frame element 36 is attached to the mounting surface by means of conventional fastening techniques.

The net component 37 of the retaining net 1 extends between the base 38 and the sides 39, 40 of the frame element 36 and is fixed to the frame element 36 on its two sides 39, 40 and edges 41, 42, 43 associated with the base 38.

On its free edge 44 extending between the free ends of the sides 39, 40 of the frame element 36, the net component 37 has an edge girth 45 which is securely fastened at both its ends to the free ends of the sides 39 or 40 in a suitable manner, e.g. by means of clamps.

The edge girth 45 is made of the same material as the rest of the net component 37.

In FIG. 4, the retaining net 1 or net component 37 is more or less rectangular; in principle, the retaining net 1 and thus the frame element 36 and the net component 37 may have any configuration desired, however, the net component 37 must have the free edge 44 or the edge girth 45 forming the free edge 44.

In the embodiment shown in FIG. 4, the net component 37 has two groups of strands 46, 47 extending inclined at a right angle to one another. The groups of strands 46 or 47 each consist of a plurality of net strands 48 or 49 that are parallel to one another.

The edge girth 45 forming the free edge 44 of the net component 37 extends parallel to the base 38 of the frame element 36 of the retaining net 1 between the free ends of the sides 39, 40 of the frame element 36. The edge girth 45 is, as previously mentioned, made of the same material as the rest of the net component 37, this material could e.g. be propylene or polyamide.

Moreover, the edge girth 45 forming the free edge 44 of the net component 37 is woven into the ends 50, 51 of the plurality of strands 46, 47 of the net component 37 associated with the free edge 44 of the net component 37. As a result, it is possible to produce the edge girth 45 of the net component 37 together with the rest of the net component 37 in a single operation. The edge girth 45 can be made in any width desired in the noted manner.

The contour of the base 38 and the sides 39, 40 of the frame element 36 can be adapted to that of the mounting surface which accommodates the retaining net 1.

The edges 41, 42, 43 of the net component 37 associated with the frame element 36 are fixed in a manner suitable herefor. For example, an edge element, not shown in FIG. 4, in the form of a bent wire, rod, band or the like can extend through the edge meshes 52, 53, 54 of the net component 37 arranged on the edges 41, 42 or 43 in question, the edge element being in turn securely fastened to the frame element 36. This edge element can, for example, be securely fastened to the frame element 36 by means of clip receptacles into which the edge element can be clamped.

Figure 5:
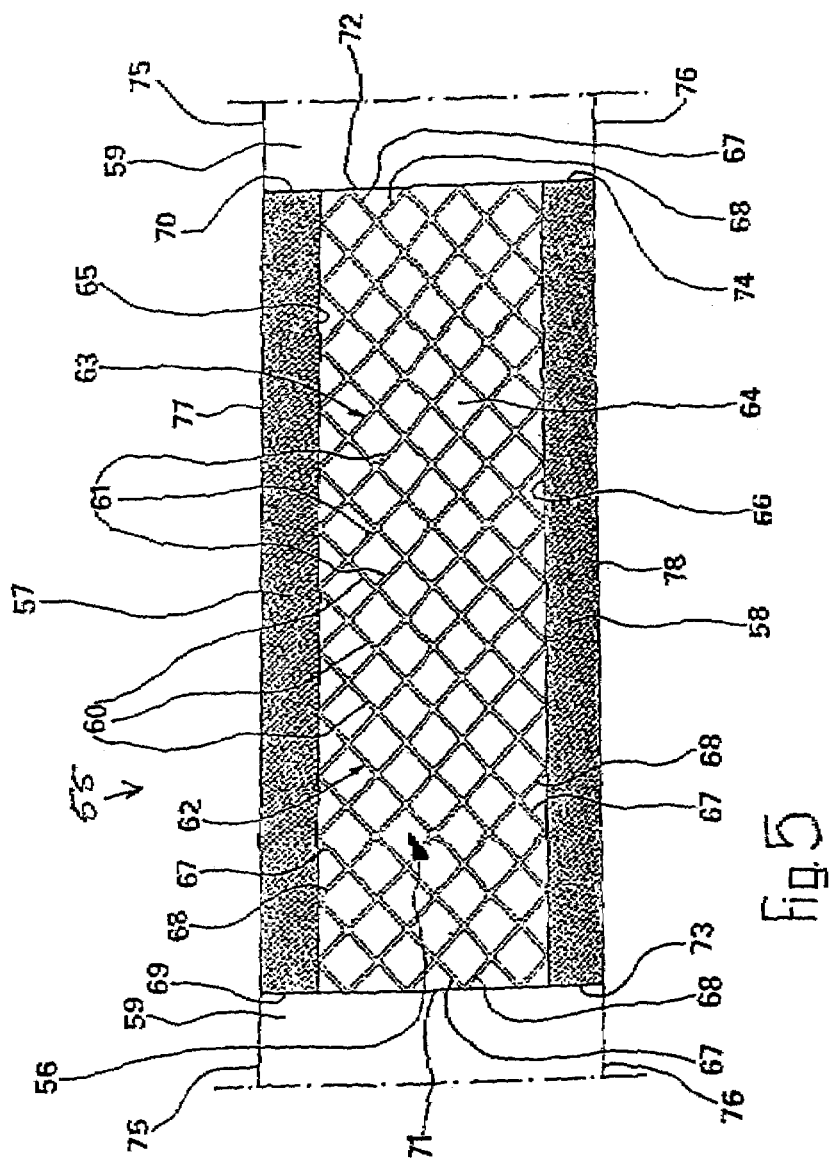
FIG. 5 is an elevational view of an embodiment of a retaining net according to the invention formed as a retaining loop, in an unwound representation.

A retaining net according to the invention shown in FIG. 5, for reasons of clarity, in an unwound state and configured as a retaining loop 55 is overall elastic and can be pulled onto a bar-shaped, rod-shaped, cylindrical or similarly shaped element (not shown in the figures); in particular, the retaining loop 55 is suitable for being pulled on a swivable sun or light visor of a motor vehicle. Due to its elastic form and dimensions, the retaining loop 5 then surrounds the respective item with a specific prestress.

The retaining loop 55 is used for securing various items, e.g. writing utensils, toll cards, handys, radio transmitters, food or the like. Due to the prestressing of the retaining loop, the aforementioned items can be securely held e.g. on the sun or light visor of a motor vehicle.

In the embodiment shown in FIG. 5, the retaining loop 55 can consist essentially of a net component 56, an upper edge girth 57 in FIG. 5, a lower edge girth 58 in FIG. 5 and a one-part connecting link 59 shown in two components in FIG. 5. The two-part representation of the connecting link 59 in FIG. 5 results from the representation of the retaining loop 55 in the unwound state.

The net component 56 of the retaining loop 55 is formed by two pluralities of strands 62, 63 each having several net strands 60, 61 and extending inclined to one another. The pluralities of strands 62, 63 or their net strands 60, 61 form rhombic net meshes 64 in the embodiment shown in FIG. 5; in principle, square, rectangular or honeycombed net meshes are also feasible.

The upper edge girth 57 and the lower edge girth 58 extend on the two longitudinal sides of the net component 56. The two edge girths 57, 58 have the same longitudinal dimensions as the net component 56; both edge girths 57, 58 have the same width. The upper edge girth 57 and the lower edge girth 58 are woven, on their inside edges 65 or 66, into the ends 67, 68 of the net strands 60, 61 of the pluralities of strands 62, 63 of the net component 56.

The net component 56 and the two edge girths 57, 58 are produced in a single operation. Sewing or the like to attach the edge girths 57, 58 to the net component is eliminated. The net component 56 and the two edge girths 57, 58 are made of the same material, e.g. this could be polypropylene or polyamide. Depending on the aesthetic or technical requirements, the two edge girths 57, 58 and also the net component 56 can be made more or less as wide as desired.

In the embodiment shown in FIG. 5 of the retaining loop 55, the upper edge girth 57 at both its face ends 69, 70, the net component 56 at both its face ends 71, 72 and the lower edge girth 58 at both its face ends 73, 74 are joined with the connecting link 59. The connecting link 59 can e.g. be configured as a girth band, whereby this girth band 59 is then also made of the same material as the net component 56, the upper edge girth 57 and the lower edge girth 58.

To form the connection of the respective face ends 69, 70, 71, 72, 73 and 74 of the upper edge girth 57, of the net component 56 or of the lower edge girth 58, the connecting element or girth band 59 is sewn together on both its sides facing the face ends 71, 72 of the net component and those 69, 70, 73, 74 of the edge girth 57, 58 with the ends 67, 68 of the net strands 60, 61 of the net component 56 facing these sides and the ends 69, 70 or 73, 74 of the upper or lower edge girth 57 or 58, respectively.

The upper outer edge 75 in FIG. 5 and the lower outer edge 76 in FIG. 5 of the connecting link or girth band 59 align with the outer edge 77 of the upper edge girth 57 or with the outer edge 78 of the lower edge girth 58.

Figure 6:
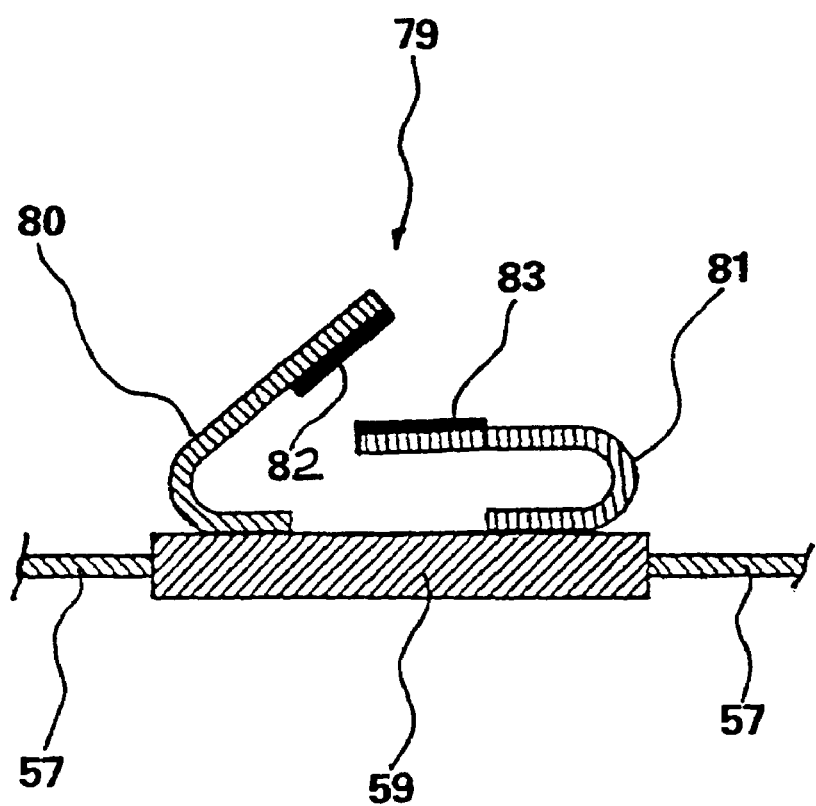
FIG. 6 is a side view of a section of the retaining loop shown in FIG. 5, formed by means of a connecting link.

As can be seen in FIG. 6, a retaining element 79 is placed or sewn onto the outer surface or outer side of the connecting link or girth band 59. This retaining element 79 has two strips 80, 81, fastened with one end to the outer surface of the girth band 59, that can be brought into an overlapping position with its free end sections and which each have a burr band field 82, 83 on surfaces that face one another there. Accordingly, the strips 80, 81 can be firmly joined together in any closed positions desired by producing an engagement between the mutual burr band fields 82, 83, so that items of various sizes, e.g. ballpoint pens, lighters, films or the like, can be secured to the connecting link or girth band 59 of the retaining loop 55 by means of the retaining element 79.

Due to the elasticity of the retaining loop 55, various items can be clamped, by means of the retaining loop 55, on the bar-shaped, rod-shaped, cylindrical or similarly designed element (not shown in the figures). Since the elasticity of the retaining loop 55 is very great both in its peripheral direction and in its axial direction, i.e. vertically to the edge girth 57, 58, comparatively wide items can also be securely held by means of the retaining loop 55. Moreover, the items clamped to the aforementioned element are in most respects visible since they are attached at least partially between the net component 56 of the retaining loop 55 and the aforementioned element and the net component 56 is to a very large degree transparent.

A retaining net 1 according to the invention shown in FIGS. 7 and 8 has a preferably elastic net weave 84 and an edge girth 85 which at least partially forms the edge 86 of the retaining net 1.

As can be seen especially in FIG. 7, the net weave 86 of the retaining net 1 has two pluralities of strands 87, 88 that extend inclined at a right angle to one another. The pluralities of strands 87 or 88 each consist of a number of parallel net strands 89 or 90.

As can be seen in a sectional representation in FIG. 8, the edge girth 85 partially shown in FIG. 7 is made in the form of a hollow tube 91. Depending on the embodiment of the retaining net 1, the edge girth 85 formed as a hollow tube 91 can extend over a part of the edge 86 of the retaining net 1 or over the entire edge 86 of the retaining net 1.

The edge girth 85 in the form of a hollow tube 91 is made of the same material as the elastic net weave 84. The edge girth 85 or hollow tube 91 is woven or crocheted into ends 92, 93 of the net strands 89 or 90 of the pluralities of strands 87 or 88 associated with it in a single operation with the production of the net weave 84. The net weave 84 and the edge girth 85 at least partially forming the edge 86 of the retaining net 1 and formed as a hollow tube 91 are thus produced in a single operation, the hollow tube 91 being made as a hollow tube without it being necessary to fold the edge girth 85 over and reshaping it to form a hollow tube by means of a seam once the production process of the retaining net 1 has been completed.

In an exemplary embodiment, the retaining net 1 has the edge girth 85 configured as a hollow tube 91 on a preferably upper edge section. It is appropriately fastened to the inside of a vehicle door on the remaining edge 86 of the retaining net 1. A metal bar or similar bar-shaped item is inserted in the edge girth 85 configured as a hollow tube 91 (not shown in the figures), in the area in which the edge 86 of the retaining net 1 is not fastened to the inside of the vehicle door. The metal bar extends more or less over the entire edge girth 85 configured as a hollow tube 91.

If, to close the vehicle door, the area of the edge 86 of the retaining net 1 not firmly connected with the inside of the vehicle door is gripped and pulled into the vehicle interior instead of a handle provided therefor, this unforeseen action can be accomplished without damage occurring to the retaining net 1 or to the inside of the vehicle door.

For this purpose, the metal bar (not shown in the figures) can have an elongated hole on its end part which is movably engaged with a retaining bolt on the inside of the vehicle door, as a result of which the metal bar is displaceable in longitudinal direction relative to the retaining bolt. On the other end not provided with the elongated hole, the metal bar can be attached to the inside of the vehicle door in a suitable manner.

Alternatively, it is possible that the metal bar be connected at both ends with the inside of the vehicle door by means of a spring, the spring being prestressed in closing direction of the retaining net 1.

In a further embodiment of the retaining net 1 according to the invention, its entire edge 86 is provided with the edge girth 85 configured as a hollow tube 91. A one-part or multipart bar, formed to correspond to the edge contour of the retaining net 1, is inserted in this edge girth 85 or hollow tube 91. Furthermore, clip connecting elements are provided on the edge 86 of the retaining net 1 or on its edge girth that can be brought into engagement with mating clip elements provided analogously on the floor of a vehicle. If pieces of luggage or the like are now positioned on the floor of the vehicle and the retaining net 1 is positioned above these pieces of luggage, the clip connections on the retaining net side can be engaged with the clip connections on the floor side of the vehicle, whereby it is prevented, due to the stiffening of edge girth 85 extending over the entire edge 86 of the retaining net 1 by means of the appropriately formed bar, that gaps occur between the vehicle floor and the edge 86 of the retaining net 1. As a result, a reliable fastening of luggage pieces is obtained on the mounting surface provided therefor.

The retaining net 1 according to the invention can be produced in one production step at a comparatively lower production expenditure, the net weave 84 and also the edge girth 85 woven into or crocheted into said weave and configured as a hollow tube 91 being produced during this single production step.

What is claimed is:

1. A retaining net comprising a net mesh that is formed by a plurality of inclined strands that extend inclined to one another, each inclined strand having several net strands, and an edge along the net mesh that is formed at least partially by an edge girth, and wherein the edge girth at least partially forming the edge of the retaining net is made of the same material as the net mesh, ends of the pluralities of net strands being associated with said girth and woven or crocheted into it, the retaining net being in the form of a floor net for a motor vehicle having a surrounding edge that is situated on edges of the net mesh the first mentioned edge girth and another edge girth being arranged on two opposite and parallel edges of the net mesh and are both made of the same material as the net mesh and are both woven into ends of the net strands forming the respective edge of the net mesh a respective said edge girth made of the same material as the net mesh is arranged on other edges of the net mesh to which ends of the net strands forming the respective edge of the net mesh are sewn and are connected with adjacent edge girths.

2. A retaining net according to claim 1 that is made of polypropylene or polyamide.

3. A retaining net according to claim 1 wherein the edge is of variable width.

4. A retaining net according to claim 1 that is quadrangular.

5. A retaining net according to claim 1 that is trapezoidal.

6. A retaining net according to claim 1 that is rectangular.

7. A retaining net according to claim 1 that is square.

8. A retaining net according to claim 1 which has a second net mesh connected to the first-mentioned net mesh by means of said edge girth whereby said edge girth forms a common edge girth for both the first and second meshes, the net meshes being symmetrical relative to said common edge girth and that are joined to outer edge girths parallel to their common edge girth.

9. A retaining net according to claim 1, further comprising at least two further net meshes whereby said net has at least three net meshes, two of said net meshes being always joined together by means of a respective said edge girth common to said two net meshes, a middle one of said net meshes being symmetrical to a central axis or two middle net meshes being symmetrical to said common edge girth.

10. A retaining net according to claim 1 which is provided on corners thereof with a retaining element for securely fastening the net to a mounting surface.

11. A retaining net according to claim 10 wherein the retaining element is configured as a hook part.

12. A retaining net according to claim 1 the net mesh and surrounding edge are elastic.

13. A retaining net comprising a net mesh that is formed by a plurality of inclined strands that extend inclined to one another, each inclined strand having several net strands, and an edge along the net mesh that is formed at least partially by an edge girth, and wherein the edge girth at least partially forming the edge of the retaining net is made of the same material as the net mesh, ends of the pluralities of net strands being associated with said girth and woven or crocheted into it, the retaining net being a respective further edge girth on each of two opposite sides that are parallel to one another, wherein the net mesh has at least one middle girth arranged at a distance from and parallel to the two further edge girths in the net mesh and each middle girth and further edge girth is made of the same material as a respective net mesh and is woven into the respective net mesh at ends of the net strands.

14. A retaining net according to claim 13, which is made of polypropylene or polyamide.

15. A retaining net according to claim 13, wherein the middle girth is spaced equidistantly from the further edge girths.

16. A retaining net according to claim 13 which has three middle girths.

17. A retaining net according to claim 13 wherein each middle girth and edge girth has the same width.

18. A retaining net according to claim 13 which has rectangular, square, honeycombed or rhombic net meshes.

19. A retaining net comprising a net mesh that is formed by a plurality of inclined strands that extend inclined to one another, each inclined strand having several net strands, and an edge along the net mesh that is formed at least partially by an edge girth, and wherein the edge girth at least partially forming the edge of the retaining net is made of the same material as the net mesh, ends of the pluralities of net strands being associated with said girth and woven or crocheted into it, the retaining net for attachment to a mounting surface on the back of a back rest, to a wall or ceiling surface, being provided with a comparatively rigid frame element that can be attached to the mounting surface, whereby the net mesh is elastic, has a free edge, is securely fastened on respective further edges to the frame element and has the edge girth on said free edge which is made of the same material as the remaining net components and ends of the net strands of the plurality of strands are woven in at the free edge of the net mesh.

20. A retaining net according to claim 19, the net mesh of which is made of propylene or polyamide.

21. A retaining net according to claim 19 wherein the edge girth on said free edge of the net mesh is securely fastened to the frame element.

22. A retaining net according to claim 21 wherein the edge girth is securely fastened to the frame element by means of clamps.

23. A retaining net according to claim 19 wherein the frame element has a basic U-shaped form with a base and two sides, the edge girth of the net mesh extending between free ends of the frame element.

24. A retaining net according to claim 19 wherein the frame element has a contour adapted to that of the mounting surface.

25. A retaining net according to claim 19 wherein edge meshes of the net mesh arranged on the frame element are passed through by an edge element which is, in turn, securely fastened to the frame element.

26. A retaining net according to claim 25, wherein the edge element extends over all edges (41, 42, 43) of the net mesh component (37) situated on the frame element (36) and is clamped into clip receptacles on the frame element (36).

27. A retaining net comprising a net mesh that is formed by a plurality of inclined strands that extend inclined to one another, each inclined strand having several net strands, and an edge along the net mesh that is formed at least partially by an edge girth, and wherein the edge girth at least partially forming the edge of the retaining net is made of the same material as the net mesh, ends of the pluralities of net strands being associated with said girth and woven or crocheted into it, the retaining net being configured as a retaining loop to be wound up on a rod-shaped element and for fixing objects to this said element has a second edge girth opposite the first-mentioned edge girth and on an inner edge woven into the ends of the net strands.

28. A retaining net according to claim 27 having a connecting link by means of which two face ends of the net mesh, of said first edge girth and of said second edge girth are each joined together.

29. A retaining net according to claim 27 wherein the net mesh has square, rectangular, honeycombed or rhombic net meshes.

30. A retaining net according to claim 28 wherein the net mesh, the edge girths and the connecting link are made of the same material.

31. A retaining net according to claim 27 wherein the edge girths are of equal width.

32. A retaining net according to claim 28 wherein the connecting link is sewn together with the ends of the net strands of the pluralities of strands facing the edge girths.

33. A retaining net according to claim 28 wherein the outer edges of the connecting link align with the outer edges of the edge girths.

34. A retaining net according to claim 28 wherein the connecting link is configured as a girth band.

35. A retaining net according to claim 28 on whose connecting link a retaining element is placed which can be brought into an open position and a closed position.

36. A retaining net according to claim 35 wherein the retaining element has burr band fields that can be engaged in a number of closed positions.

37. A retaining net comprising a net mesh that is formed by a plurality of inclined strands that extend inclined to one another, each inclined strand having several net strands, and an edge along the net mesh that is formed at least partially by an edge girth, and wherein the edge girth at least partially forming the edge of the retaining net is made of the same material as the net mesh, ends of the pluralities of net strands being associated with said girth and woven or crocheted into it, said edge girth being a hollow tube, a bar being insertable into the edge girth.

38. A retaining net according to claim 37, which is fastened with an outer edge provided with the edge girth to the inside of a vehicle door and wherein a metal bar is inserted into the edge girth in the form of a hollow tube.

39. A retaining net according to claim 38 wherein the metal bar in the hollow tube has an elongated hole at one end portion which is movably engaged with a retaining bolt in a longitudinal direction of the metal bar.

40. A retaining net according to claim 38 wherein the metal bar in the hollow tube is connected with the inside of the vehicle door, at least on one end, by means of a spring prestressed in a closing direction of the retaining net.

41. A retaining net according to claim 37 wherein the edge girth in the form of a hollow tube extends over an entire edge of the net mesh (84), said bar designed according to an edge contour of the retaining net, and the edge girth having clip connecting elements for attaching the retaining net to a mounting surface of a motor vehicle.

42. A retaining net according to claim 1 wherein the net mesh is made of an elastic material.

* * * * *